3,654,164
DRILLING FLUIDS
Russell L. Sperry, Ojai, Calif., assignor to Petroleum Solids Control, Inc., Long Beach, Calif.
No Drawing. Continuation of application Ser. No. 716,552, May 27, 1968, which is a continuation-in-part of application Ser. No. 588,627, Oct. 21, 1966. This application June 3, 1970, Ser. No. 41,754
Int. Cl. C10m 3/22
U.S. Cl. 252—8.5 A           6 Claims

ABSTRACT OF THE DISCLOSURE

Drilling mud additive compositions are provided which, when added to drilling mud systems, cement the clay cuttings from the drilling operation and prevent their disintegration while at the same time control the viscosity of the drilling fluid. These compositions, which display cohered inhibition against hydratable shales or "gumbo" clays, are characterized by a combination of (1) a copolymer of equimolar amounts of maleic anhydride with alkyl vinyl ether, in which the alkyl contains from 1 to 4 carbon atoms, having a specific viscosity of from 1.3 to about 6 at 1% by weight concentration in methyl ethyl ketone at 25° C., and (2) a water-soluble inorganic salt in which the cation is either sodium, potassuim, rubidium and cesium or a mixture of sodium and potassium and in which the anion is either a halide, carbonate, bicarbonate, sulfate, sulfite, sulfide, sulfamate, nitrate, nitrite, chromate, dichromate, molybdenate and vanadate and the ratio of said copolymer to the said inorganic salt ranging from about 1:25 to 3:1.

---

This application is a continuation of application Ser. No. 716,552, filed May 27, 1968 which in turn is a continuation-in-part of application Ser. No. 588,627, filed Oct. 21, 1966, both now abandoned.

This invention relates to drilling fluids which are employed in the drilling of oil and gas wells and to the process of drilling such wells while employing additive compositions for the drilling fluids which display cohered inhibition against hydratable or "gumbo" clays, i.e., the hydratable shales neither distintegrate nor disperse in the drilling mud system. The presence of the additive compositions, as defined hereinafter, in the drilling mud system while wetting and swelling each of the dispersed "gumbo" clay particles in the system, retard or inhibit the hydration of such particles whereby they remain cohered and essentially in their original size and shape. In other words, the additive compositions in the drilling fluid cohere or cement the "gumbo" clay cuttings from the drilling operation and prevent their disintegration while at the same time control the viscosity and waterloss properties of the drilling mud fluids.

In the drilling of wells using rotary drilling tools, a rotary bit is attached to the lower end of a hollow pipe or drill stem, the combination being rotated to drill out the bore hole. The drilling fluid is circulated down the pipe and through the bit at the bottom of the hole and returns to the surface through the annular space between the drill pipe and the wall of the bore hole. After removal of cuttings which include all of the heterogeneous materials encountered during the penetration of the earth's crust, either by means of screens, settling pits or cyclone separators, the fluid is recirculated down the pipe. This operation is continuous in nature until the desired depth has been reached, or until oil or other material being sought is found.

The primary functions of the drilling fluid are to lubricate and cool the drill bit and to suspend and carry the cuttings out of the bore hole. In order to achieve satisfactory performance with any particular fluid, it is of course obvious that there be maintained a substantial degree of dimensional stability of the bore hole and at the same time maintaining fairly constant properties of the drilling fluid. The usual desired and necessary properties of the fluid include maintaining relatively constant viscosity thereof along with low water loss to the formations surrounding the bore hole. Patently, the bore hole must be dimensionally stable to prevent collapse thereof or enlargement in the form of bell-hole sections which may eventually become several times as large as the drilled hole. In addition to cave-ins and enlargement of the bore hole, it is also possible for the hole to constrict above the drill bit by virtue of the swelling due to hydration of clays and shales in the formation. Each of the aforementioned conditions can cause a stuck drill pipe with serious loss of time and tools and may often necessitate redrilling of the hole.

The usual drilling fluid consists essentially of an aqueous dispersion of a hydratable clay material such as bentonite which imparts to the fluid the necessary and desirable physical characteristics. At the same time these clays also impart desirable thixotropic properties which can be controlled and varied by the addition of various reagents such as polyphosphates, lignites, tannins, lignins and the like. The drilling fluids must, of course, also be readily pumpable without causing undue pressure differential, but at the same time the fluid must have sufficient weighting to apply the necessary hydrostatic pressure to the formation to counterbalance the pressure of liquids and/or gases which are often encountered in the drilling of such formations and the entrance of which into the bore hole is undesirable.

The attainment of a drilling fluid or drilling mud which is economical to use, which exhibits all of the necessary characteristics to achieve a good bore hole, and which is capable of employment regardless of the nature of the substrates to be penetrated by the drill has long been wanting and constitutes one of the primary objects of the present invention.

It is the principal object of the present invention to provide drilling fluids, and particularly drilling fluids containing hydratable clays, which may be used in drilling bore holes through diverse formations in the earth's surface.

A further object is to provide drilling muds containing hydratable clays which may be employed in the rotary drilling of bore holes, which fluids are economical to prepare, maintain substantially constant physical characteristics, and which permit the drilling of dimensionally stable bore holes.

A still further object is to provide new and useful additive compositions which impart to drilling muds, and particularly hydratable clay-containing drilling muds, outstanding and unexpected properties.

It is still another further object of the present invention to provide a process for drilling bore holes through and into the earth's surface while employing a new, useful and outstanding drilling fluid which will cohere or cement the shale or "gumbo" clay cuttings from the drilling operation and prevent their disintegration while at the same time controlling the viscosity of the drilling fluid.

Other objects and advantages will become more clearly manifest from the following specification.

As pointed out above, one of the essential characteristics of a drilling fluid is its low water-loss characteristics or, in other words, its ability to prevent the loss of water to the surrounding formation during the drilling operation. Many materials have heretofore been suggested for such purposes. Among these, mention may be made of polymeric salts such as sodium polyacrylate, hydrolyzed polyacrylonitrile, copolymers of maleic anhydride with vinyl acetate or vinyl methyl ether (1:1 molar ratio) having viscosities between 1 and 3.1 centipoises at 25° C. when in solution in water at 0.4% by weight concentration, various cellulose derivatives such as sulfited cellulose, alkali reacted cellulose, lignins, various treated lignins, methyl cellulose, carboxy methyl cellulose and the like. While the use of such additives, and even a hydratable clay such as bentonite, results in a substantial lessening of the water loss from the drilling fluid, nevertheless, despite improvement of this characteristic, the fluids do not solve the problems, especially when drilling silty, clayey formations and gumbo shales. In drilling through such formations, the very presence of water in the drilling fluid maintained at an essentially constant concentration still results in excessive wetting of the shales and clay-bearing formations at the surface of the well bore even though theoretically at a reduced rate. As pointed out above, this creates a tendency for such wetted material to swell and sluff off the face of the bore and become a part of the drilling fluid. In addition to the problems arising from enlargement of the well bore as described above, the addition to the fluid of hydrated clay creates changes in the physical characteristics thereof which are highly undesirable. This additional clay creates a change in the viscosity characteristics of the fluid, necessitating during the recirculation of the fluid the addition of re-agents to readjust the viscosity. Usually large amounts of water are constantly added to maintain the weight and viscosity characteristics required. Clearly, this creates a situation wherein the volume of fluid is constantly increasing beyond that required to maintain the system, which is not only undesirable from a handling point of view but also increases sumpage volumes, which is becoming a major cost in the drilling operations. The cost of the additional reagents needed to maintain the required properties of the fluid also adds to the economic burden and impracticability of the entire operation.

One suggested approach to solve this problem of added dispersed and hydrated clay to the drilling fluid has been to alter the composition of the fluid to such a degree that clays are not hydrated. The use of oil base muds with an oil filtrate in place of a water filtrate is an example of such an approach. A second approach along the same general lines has been the development of the so-called inhibited muds. These are aqueous clay based fluids which contain high concentrations of ions which completely prevent the hydration of any of the clay produced as cuttings during the drilling. In such systems, the viscosity of the fluid remains relatively low despite an increase in weight resulting from the dispersion and suspension of clay solids from the cuttings. Contrary to expectations, however, these inhibited muds, instead of imparting unusual stability to the face of the well bores by virtue of the fact that the clays in the formation would not hydrate and expand to produce the troublesome problems described above, do exactly the reverse; apparently the excessive ion concentration destroys the cohesive bonding between clay particles, causing a continuous erosion to inert fines or silty clay particles. In comparing an inhibited mud with a conventional low water loss mud, it has been found that with inhibited muds, excessive bell-holes are produced in the formations, often in zones where the conventional muds showed reasonably good hole stability. Since this appeared to be inconsistent with the character of the muds, the explanation offered was that such wash-outs in the formation are caused by the very low viscosities usually maintained with the inhibited muds. It would, therefore, appear that an impasse had been reached especially in those operations where drilling was to take place through formations containing large substrates of clays and shales. Contrary, however, to such an apparent impasse, it has now been discovered that drilling fluids, and particularly drilling muds based upon hydrated clays, can be prepared with outstanding characteristics of constant physical properties and acceptable water loss leading to the production of improved dimensionally stable bore holes through most clay and silty formations.

In other words, the drilling fluids, particularly drilling muds based upon hydrated clays, prepared in accordance with the present invention, display cohered inhibition against such clays and cohere or cement such clay cuttings from the drilling operation and prevent their disintegration while at the same time controlling the viscosity of the drilling fluid.

The drilling fluids of the present invention which are characterized by such outstanding properties as described above, contain as the critical and essential components thereof, a combination of (1) a copolymer of equimolar amounts of maleic anhydride with an alkyl vinyl ether in which the alkyl contains from 1 to 4 carbon atoms and the copolymer having a specific viscosity, as determined by the Ostwald-Fenske viscosimeter, or any other capillary viscosimeter, of from 1.3 to about 6 at 1% by weight concentration in methyl ethyl ketone at 25° C., and (2) a water-soluble inorganic salt, the components of the combination being present in specified critical relationship. The said copolymer must be soluble in water in the contemplated concentrations. The anhydride groups present in the copolymer may be hydrolyzed in the customary manner to water-soluble carboxy groups or they may be converted to salt groups in the conventional manner while employing the usual water soluble cation salts of sodium, potassium, ammonium, and the like.

The copolymers as defined above are prepared by the procedure outlined in U.S. Pat. 2,047,398. The specific viscosities of the copolymers, i.e., from 1.3 to about 6, when related to weight average molecular weights are in the range from 800,000 to about 4,000,000. These weight average molecular weights were calculated from light scattering measurements while employing methyl ethyl ketone as solvent.

As examples of specific copolymers (1:1 molar ratios) conforming to the foregoing specific viscosities, the following are employed:

vinyl methyl ether-maleic anhydride
vinyl ethyl ether-maleic anhydride
vinyl n-propyl ether-maleic anhydride
vinyl isopropyl ether-maleic anhydride
vinyl n-butyl ether-maleic anhydride
vinyl isobutyl ether-maleic anhydride The foregoing copolymers are preferably employed as the sodium salts, although potassium salts may also be employed.

The second critical component of the combination consists of a water-soluble inorganic salt. The salts which are operable in this invention are those which are characterized by the cation being one of the group comprising sodium, potassium, rubidium and cesium, and the anion being one selected from the group comprising halide, carbonate, bicarbonate, sulfate, sulfite, sulfide, sulfamate, nitrate, nitrite, chromate, dichromate, molybdate and vanadate. Instead of a single water-soluble inorganic salt having any one of the foregoing cations, a mixture of sodium and potassium salts of the foregoing anions may also be employed. The mixture may consist of 10–90 parts by weight of the sodium salt and 90–10 parts by weight of the potassium salt.

In addition to the critical nature of the above described two components, it is also essential that they be employed within carefully described limits, such limits in describing the ratio of copolymer to inorganic salt (or mixture of the aforesaid sodium and potassium salts) being from about 1:25 to about 3:1. Still further, these two components must be used in concentrations which are also critical in order to achieve the ends to which the present invention is directed. The concentration of copolymer in the drilling fluid may range from about 0.10% to about 1% by weight based upon the weight of the drilling fluid and the water-soluble inorganic salt (or mixture of the aforesaid sodium and potassium salts) may vary in concentration from about 0.3% to about 1.7% by weight based upon the weight of the drilling fluid, with the preferred range being from about 0.7% to about 1.2% by weight. The maximum inorganic salt (or salt mixture) concentration, however, should not exceed about 6 pounds per barrel (42 gallons) of mud. The upper limit of copolymer is not as critical as the lower limit or the limits of the inorganic salt concentration but it is preferred not to exceed 1% by weight and within the designated range a most preferred concentration of copolymer is from about 0.15% to 0.5% by weight.

The employment of the aforementioned two components in ratios and concentrations as above described in an aqueous drilling fluid, and in particular a hydratable clay-based drilling mud, results in a system which hereinafter will be referred to as a cohered inhibited mud system. The essential and outstanding characteristic of this system is the achievement of a relatively constant fluid despite the continual addition of hydratable clays notwithstanding the fact that the system contains a major amount of water. Clay cuttings which result from the drilling operation in such a system do not disperse and thicken the fluid, nor do they disintegrate into sandy-like fines as is the case with the so-called inhibited mud systems. Instead, the clay cuttings remain as coherent agglomerates, non-dispersible in water, the surfaces of which have become slightly swollen. This swelling and cementation action on the surface acts to keep the clay cuttings as a coherent mass and prevents the disintegration of the particles into fines.

Cuttings taken from a conventional mud, including low water-loss polyacrylate, CMC, etc., fluids, quickly washed with water, when placed in water, continue normal hydration just as if they had never been in the mud. Cuttings of gumbo shales from the drilling fluids containing the two components, copolymer and inorganic salt, of the present invention, to the contrary, when treated identically, are remarkably stable even in pure water; sometimes remaining unchanged for months. No mud previously designed or conceived has attained this remarkable property—not even the oil-base muds.

A further characteristic of the clay particles is the permeation throughout the mass thereof of water whereby the particle can be best described as wet throughout its mass. Not only do the clay cuttings in this condition fail to contribute or add to the weight and viscosity of the drilling fluid, but by virtue of their abnormally large size and density, they may be readily separated from the fluid by any of the conventional techniques and usually in a much more expeditious manner than heretofore possible with material in a much finer state of subdivision. Still further, it has been found that the bore hole will maintain remarkable dimensional stability through strata of clay and shale due to the fact that the slight swelling action which takes place on the surface of the clay will act to seal the hole against water-loss to the surrounding formations and by virtue of creating a water-insensitive wall face, there will be little sluffing off or break-down of the bore hole wall, and finally, the walls of the bore hole will exhibit surprising cohesive strength exhibiting physical characteristics which one might find were the walls to be smoothly coated with a dense, relatively impenetrable water-insensitive plastic material. The net result of what has been described heretofore when using drilling fluids containing the two components, copolymer and inorganic salt, in the manner above described is the achievement of a process for drilling wherein the drilling fluid maintains remarkable uniform physical and chemical characteristics throughout the drilling operation notwithstanding the heterogeneity of the various strata through which the drill is penetrating, and in addition, the bore hole which is produced has outstanding dimensionable stability and uniformity, exhibiting a minimum of cave-ins, sluffing off of side walls, swelling of side walls leading to constrictions and the like.

The fluids of the present invention and, as described previously, particularly the aqueous-based drilling fluids, comprise in addition to the aforementioned critical copolymer-inorganic salt composition, an inorganic solid dispersed in the water. This inorganic solid may be a clay, hydratable or non-hydratable type, or any other suitable or conventional inorganic weighing material such as silica, barium sulfate, barium carbonate, ferric oxide, lead oxide, calcium carbonate and the like. The hydratable clays are employed as heretofore pointed out, to obtain a thickened drilling fluid or mud of proper viscosity characteristics and also to impart the desired and necessary thixotropic characteristics which are emphasized by sufficient gel strength in the fluid to prevent settling of solids from the mud when the fluid is not being pumped or circulated through the well bore. Among suitable hydratable clays, mention may be made of Wyoming bentonite, Rogers Lake clay, Ventura clays, as well as clays such as are mined in Texas, Tennessee and Louisiana. Such muds as are herein contemplated are known as sodium muds, i.e., the predominating cation in the mud being sodium or an alkali metal as distinguished from a calcium or lime mud. In addition to the solid inorganic dispersed material, the drilling fluids of the present invention may also include minor controlled amounts of some of the other conventional additives normally used in such fluids for viscosity control characteristics, gel strength properties, and low water-loss characteristics. Such additives include causticized lignite, various cellulose derivatives, quebracho, natural gums, starch, and the like. The fluids also emulsify oils normally used in preparing emulsion muds.

The following compositions illustrate suitable copolymer-inorganic salt combinations which may be used to produce the drilling fluids of the present invention. The amounts indicated are those suitable to prepare one barrel of drilling fluid, i.e., 42 gallons. In each instance, 1 pound of lower alkyl vinyl ether-maleic anhydride copolymer (1:1 molar ratio) sodium salt, having a specific viscosity of 1.3 to about 6.0 at 25° C. in 1% weight concentration in methyl ethyl ketone, is employed with 3 pounds of any one of the following inorganic salts:

(a) sodium dichromate
(b) sodium chromate
(c) sodium molybdate
(d) sodium nitrate
(e) sodium nitrite
(f) sodium sulfite
(g) sodium sulfide
(h) sodium chloride
(i) sodium fluoride
(j) sodium sulfamate
(k) potassium sulfamate
(l) potassium nitrate
(m) potassium carbonate
(n) potassium dichromate
(o) potassium sulfite
(p) cesium chloride
(q) cesium fluoride
(r) cesium nitrate
(s) cesium sulfate
(t) rubidium bromide
(u) rubidium carbonate
(v) rubidium chloride
(w) rubidium dichromate
(x) rubidium nitrate
(y) rubidium sulfate
(z) sodium bromide
(aa) potassium sulfate Instead of employing 3 lbs of a single inorganic salt, the same weight in lbs. may be used of a mixture of any one of the above sodium and potassium salts (including their chlorides, carbonates and bicarbonates). The mixture may consist of from 10–90 parts by weight of the sodium salt and from 90–10 parts by weight of the potassium salt.

Other compositions which exemplify operable copolymer inorganic salt combinations are similar to those above described but wherein the inorganic salt is used in amounts of 2, 3, 4, 5 and 6 pounds per barrel with 1 pound of copolymer. Still further, each of the combinations with varying amounts of salt may also have variations in the amount of copolymer such as ½ pound per barrel, 1 pound per barrel, 1½ pounds per barrel, and 2 pounds per barrel.

In place of the sodium salts used with the aforementioned copolymeric materials to effect water-solubility thereof, one may also employ the corresponding potassium salts.

The following examples will serve to illustrate the present invention without being deemed limitative thereof. Parts are by weight unless otherwise indicated. Where the numerical value of the specific viscosity is given, it is to be understood that the specific viscosity was determined as indicated heretofore.

EXAMPLE 1

This example demonstrates the adequate water-loss characteristics of the drilling fluids of this invention accomplished by the addition to the drilling mud of one of the operable copolymer-inorganic salt combinations vis-a-vis a normal salt contaminated mud. In addition, it also demonstrates, qualitatively, the coherent inhibiting characteristics of the fluid or its ability not to disperse hydratable clay which is added thereto.

(A) A drilling mud is prepared containing 18 g. of bentonite prehydrated in 350 cc. of water. The resultant mud is characterized as being thick in its viscosity properties. A standard A.P.I. fluid loss test 29 is carried out. After 5 minutes this mud has a water loss of 9.8 cc., after 15 minutes 13.0 cc., and after 30 minutes 18.2 cc.

(B) To a similar mud there is added 1 g. of potassium dichromate. The resultant mud is somewhat more viscous than the mud of Part A but has a water loss greatly exceeding that of the mud of Part A.

(C) Again, to a mud similar to that prepared in Part A there is added ½ g. of potassium dichromate and 4 g. of causticized lignite. The resultant mud has a viscosity slightly less than that of Part A but a higher water loss.

(D) To a mud similar to that used in Part A there are added about 1 g. of potassium dichromate and 1 g. of the full sodium salt of the copolymer of methyl vinyl ether with maleic anhydride (1:1 molar ratio) having a specific viscosity of 2.8 at 1% by weight in methyl ethyl ketone at 25° C. This mud is very thin and the water loss as measured above is 4.3 cc. after 5 minutes, 7.2 cc. after 15 minutes and 10 cc. after 30 minutes.

The above data demonstrate that inorganic salt by itself increases the viscosity of the mud and sharply increases the water loss (Part B). The addition of a water-loss control reagent such as causticized lignite lowers the viscosity and also lessens the water loss somewhat but still is not as good as the mud of Part A. Finally, the combination of the inorganic salt with a copolymer within the teachings of the present invention not only leads to a very low viscosity mud (less than the mud of Part B) but further, has a water loss which is far superior to that of the bentonite mud alone, and within normally acceptable standards especially since the filtrate is hydration inhibiting.

EXAMPLE 2

To each of the four mud samples prepared in Example 1 above there is added 50 g. of a screened Mojave Lake clay (plus 30—12 mesh). The muds so produced are hot-rolled for 2 hours, allowed to stand over night and then hot-rolled again for 2 hours. The muds of Parts A and B from Example 1 are soupy with all of the additional clay dispersed therein. Filtering through a 30-mesh screen shows that none of the clay remains in original size pieces. The water loss of these two muds has improved somewhat to values of 4.6 cc. and 7.8 cc. respectively, after 5 minutes and 11.2 cc. and 18.0 cc., respectively, after 30 minutes. The mud used from Part C of Example 1 has a slightly lessened viscosity and, again, all of the clay has become dispersed therein. As with the preceding two muds, the water loss has lessened somewhat to values of 4.6 cc., 8.3 cc., and 11.7 cc. after 5, 15 and 30 minutes, respectively. In contrast with these muds, the mud of Part D has remained thin in viscosity properties and none of the clay which has been subsequently added has been dispersed. This clay has settled to the bottom and is readily separable from the rest of the mud on a 30 mesh screen, over 85% of the clay is recovered in essentially its original size and shape; each piece individually and separately stabilized even when placed in pure water. The water loss as measured is a slight bit less than the original sample in Part D and again indicates much superior product with respect to this characteristic than the other three samples.

EXAMPLE 3

A bentonite mud similar to that of Part A of Example 1 is prepared and treated to form what is generally considered to be an inhibited type and containing ferrochrome lignosulfonate, sodium chromate and causticized lignite. The water loss after 15 minutes with this product is 9.6 cc.

By the addition of 2 g. of sodium chromate and 2 g. of the copolymer used in Example 1, Part D, to the mud of Part A, Example 1, there results a product with a water loss after 15 minutes of only 4.2 cc.

EXAMPLE 4

To each of the two muds prepared in Example 3 there are added 50 g. of screened clay as in Example 2. In the salt-inhibited mud the additional clay becomes completely dispersed and none settles on standing or is separable in original form even on a 200 mesh screen. With the second sample (i.e., the one of this invention), there is only slight dispersion of the clay and substantially all of it settles out and is readily separable in essentially original shape and form by decantation and on a 30-mesh screen.

In the above examples, 1 g. of inorganic salt and copolymer corresponds to about 1 pound per barrel of mud and 2 g. of these materials corresponds to about 2 pounds per barrel of mud.

EXAMPLE 5

(A) In this example there is demonstrated that increasing the inorganic salt concentration produces somewhat better results as the amount is raised from 1 pound per barrel but beyond about 6 pounds per barrel the overall properties are detrimentally affected. A base mud is prepared containing 15 pounds per barrel of prehydrated bentonite, ½ pound per barrel of causticized lignite, and 1 pound per barrel of the same copolymer salt used in Part D of Example 1. The resultant mud is an almost water-thin fluid. To an aliquot portion of this mud there is then added additional coarse clay as in Example 2. The resulting mud, after settling and screening, still is very thin in its viscosity characteristics but has increased in weight the equivalent of about 3 pounds per cubic foot, indicating that about three fourths of the added clay has become colloidally dispersed in the mud.

(B) Similar muds are prepared containing, additionally, 1, 2, 3 and 10 pounds per barrel of sodium nitrate. Again, aliquot portions are treated with additional clay as in Example 2, and the increased weight of the mud after settling and screening is noted. For the 1, 2, 3 and 10 pounds per barrel of salt, the weight increases are 1.2, 0.8, 0.4, and 0.3 pound per cubic foot, respectively. All of the muds are water-thin. In the samples containing 1, 2 and 3 pounds per barrel of salt, however, the clay remains in its original non-cohered form; wet and slightly swollen but neither agglomerated nor, conversely, reduced to fines, which disperse and suspend in the mud under normal drilling conditions. Where 10 pounds per barrel of salt is used, the separated non-dispersed clay is in the form of non-hydratable sandy fines which are difficult to separate in normal practice. The latter clearly indicates that in drilling through hydratable clayey formations with such a mud, the wall of the formation will not hydrate at all, and there will be continually sluffing off, creating hole enlargement and problems attendant therewith as mentioned above. With the lower concentrations of salt, the walls will become partially hydrated at their surface, will not sluff off, will form a relatively impenetrable barrier, and become cemented together with the surface being water-insensitive.

EXAMPLE 6

Example 5(B) is repeated except that in place of sodium nitrate the following salts are used in the indicated amounts.

| Salt | Lbs./barrel of mud | | |
|---|---|---|---|
| (a) Sodium chromate | (1) 1 | (2) 3 | (3) 6 |
| (b) Sodium dichromate | (1) 1.5 | (2) 3.5 | (3) 5.5 |
| (c) Sodium molybdate | (1) 2 | (2) 4 | (3) 5 |
| (d) Sodium nitrite | (1) 1 | (2) 2 | (3) 4 |
| (e) Sodium sulfite | (1) 1 | (2) 3 | (3) 6 |
| (f) Sodium chloride | (1) 1 | (2) 3 | (3) 6 |
| (g) Sodium bromide | (1) 1.3 | (2) 2.1 | (3) 5.7 |
| (h) Sodium iodide | (1) 2.2 | (2) 3.7 | (3) 6 |

In the following table, the weight increases in lbs./ft.$^3$ of mud are given after 3 hours and 24 hours:

| | After 3 hours | After 24 hours |
|---|---|---|
| a(1) | 0.4 | 1.5 |
| a(2) | 0.3 | 1.3 |
| a(3) | 0.2 | 1.1 |
| b(1) | 0.5 | 1.5 |
| b(2) | 0.4 | 1.1 |
| b(3) | 0.4 | 1.1 |
| c(1) | 0.4 | 1.2 |
| c(2) | 0.2 | 1.0 |
| c(3) | 0.2 | 1.0 |
| d(1) | 0.4 | 1.4 |
| d(2) | 0.4 | 1.3 |
| d(3) | 0.3 | 1.1 |
| e(1) | 0.6 | 1.0 |
| e(2) | 0.5 | 0.8 |
| e(3) | 0.5 | 0.7 |
| f(1) | 0.7 | 1.3 |
| f(2) | 0.6 | 1.2 |
| f(3) | 0.4 | 1.0 |
| g(1) | 0.6 | 1.4 |
| g(2) | 0.5 | 1.3 |
| g(3) | 0.4 | 1.1 |
| h(1) | 0.5 | 1.3 |
| h(2) | 0.4 | 1.1 |
| h(3) | 0.3 | 1.0 |
| Control: with no copolymer and no salt | | 5.0 |

It should be noted that the mud samples containing the clay were rotated at 150 r.p.m. at 150° F. throughout the test period. Some grinding by attrition to suspendable fines is bound to occur, accounting for a reasonable percent of the observed weight increase. Also, the non-dispersed clay does become wetted withdrawing water from the base mud accounting also for a few 0.1's of a lb./bbl. weight increase.

EXAMPLE 7

Example 6 is repeated using the following salts in the indicated amounts:

| Salt | Lbs./barrel of mud | | |
|---|---|---|---|
| (a) Potassium chromate | (1) 1 | (2) 3 | (3) 6 |
| (b) Potassium dichromate | (1) 1.5 | (2) 3 | (3) 6 |
| (c) Potassium nitrate | (1) 1 | (2) 3 | (3) 6 |
| (d) Potassium sulfate | (1) 1 | (2) 3 | (3) 6 |
| (e) Potassium sulfamate | (1) 1 | (2) 3 | (3) 6 |
| (f) Potassium chloride | (1) 1 | (2) 3 | (3) 6 |
| (g) Potassium carbonate | (1) 1 | (2) 3 | (3) 6 |
| (h) Potassium bicarbonate | (1) 1 | (2) 3 | (3) 6 |
| (i) Cesium chloride | (1) 1 | (2) 3 | (3) 6 |
| (j) Cesium sulfate | (1) 1 | (2) 3 | (3) 6 |
| (k) Rubidium bromide | (1) 1 | (2) 3 | (3) 6 |

In the following table the weight increases in lbs./ft.$^3$ of mud are given after 3 hours and 24 hours:

| Example 7 | After 3 hours | After 24 hours |
|---|---|---|
| a(1) | 0.4 | 1.1 |
| a(2) | 0.2 | 1.0 |
| a(3) | 0.2 | 0.9 |
| b(1) | 0.5 | 1.0 |
| b(2) | 0.3 | 0.8 |
| b(3) | 0.2 | 0.8 |
| c(1) | 0.3 | 1.0 |
| c(2) | 0.2 | 0.9 |
| c(3) | 0.2 | 0.8 |
| d(1) | 0.5 | 1.1 |
| d(2) | 0.3 | 1.0 |
| d(3) | 0.1 | 0.7 |
| e(1) | 0.6 | 1.3 |
| e(2) | 0.4 | 1.1 |
| e(3) | 0.4 | 1.0 |
| f(1) | 0.3 | 1.1 |
| f(2) | 0.2 | 1.0 |
| f(3) | 0.2 | 0.8 |
| g(1) | 0.6 | 1.7 |
| g(2) | 0.4 | 1.6 |
| g(3) | 0.3 | 1.2 |
| h(1) | 0.8 | 1.7 |
| h(2) | 0.7 | 1.7 |
| h(3) | 0.5 | 1.3 |
| i(1) | 0.3 | 0.8 |
| i(2) | 0.2 | 0.7 |
| i(3) | 0.1 | 0.6 |
| j(1) | 0.4 | 0.8 |
| j(2) | 0.2 | 0.7 |
| j(3) | 0.2 | 0.6 |
| k(1) | 0.3 | 0.7 |
| k(2) | 0.1 | 0.5 |
| k(3) | 0.1 | 0.4 |
| Control: with no copolymer and no salt | | 5.0 |

EXAMPLE 8

Example 6 is again repeated using the following salts in the indicated amounts:

| | Lbs./barrel of mud | |
|---|---|---|
| (a) Disodium hydrogen phosphate | (1) 1 | (2) 3 |
| (b) Potassium pyrophosphate | (1) 1 | (2) 3 |
| (c) Sodium tetraborate | (1) 1 | (2) 3 |
| (d) Sodium borate | (1) 1 | (2) 3 |
| (e) Sodium silicate | (1) 1 | (2) 3 |
| (f) Dipotassium acid phosphate | (1) 1 | (2) 3 |
| (g) Calgon | (1) 1 | (2) 3 |
| (h) Sodium tetraphosphate | (1) 1 | (2) 3 |

In the following table the weight increases in lbs./ft.$^3$ of mud are given after 3 hours and 24 hours:

| Example 8 | After 3 hours | After 24 hours |
|---|---|---|
| a(1) | 3.0 | 4.0 |
| a(2) | 2.1 | 3.3 |
| b(1) | *4.8 | |
| b(2) | *4.8 | |
| c(1) | *4.8 | |
| c(2) | *4.8 | |
| d(1) | 3.4 | *4.8 |
| d(2) | 3.2 | *4.8 |
| e(1) | 3.8 | *4.8 |
| e(2) | 3.6 | *4.8 |
| f(1) | 3.2 | 4.3 |
| f(2) | 3.0 | 4.5 |
| g(1) | *4.8 | |
| g(2) | *4.8 | |
| g(3) | *4.8 | |
| h(1) | *4.8 | |
| h(2) | *4.8 | |
| h(3) | *4.8 | |

*A weight increase of 4.8 lbs./ft.$^3$ indicates complete dispersion of the clay in the mud. It should be noted that screening even on 200 mesh screens shows only mushy traces of clay not colloidally dispersed.

By comparing the data in this example with that in Examples 6 and 7, it is clear that the salts used in the present invention perform admirably to prevent the dispersion of the clay added to the mud, whereas the salts in Example 8 cause complete dispersion and hydration of the clay or substantially complete dispersion. Note that Example 8b(1) and (2) and c(1) and (2) completely disperse the clay after 3 hours [a 4.8–5 lb./ft.$^3$ increase is equivalent to complete dispersion].

In addition to the excellent action of the salts and copolymer (Examples 6 and 7) combinations of the present invention in maintaining low mud weights, which is a manifestation of the dispersion-inhibiting action of such combinations, the added clay particles remain cohered in their original form, wetted throughout but only slightly swollen, and as individually separate particles with no "balling."

EXAMPLE 9

Example 5(b) is again repeated using, however, the following copolymers:

(a) methyl vinyl ether-maleic anhydride (1:1 molar ratio), sodium salt, specific viscosity of 2.3 and average molecular weight of 1,400,000.

(b) ethyl vinyl ether-maleic anhydride (1:1 molar ratio), sodium salt, specific viscosity of 1.6 and average molecular weight of 1,000,000.
(c) n-propyl vinyl ether-maleic anhydride (1:1 molar ratio), sodium salt, specific viscosity of 1.4 and average molecular weight of 900,000.
(d) n-butyl vinyl ether maleic anhydride (1:1 molar ratio), sodium salt, specific viscosity of 1.3 and average molecular weight of 800,000.

The following results were obtained:

| Example 9: | Wt. increase in lbs./ft.$^3$ after 24 hours |
|---|---|
| (a) | 1.0 |
| (b) | 1.0 |
| (c) | 1.1 |
| (d) | 1.2 |

EXAMPLE 10

Example 9 was repeated using in place of sodium nitrate, the following salts:

(a) potassium chromate
(b) potassium nitrate
(c) potassium sulfate
(d) sodium chromate The results obtained were comparable to those of Example 9.

In the above examples many different inorganic salts and different concentrations are employed to demonstrate the basic nature of the present invention. The selection of any particular salt or combination of salts will depend on the availability thereof, and more particularly upon the nature and composition of the various strata through which the drilling is carried out and the problems encountered thereby. Thus chromates are desirable to afford corrosion control. To reduce sensitivity of the mud to gypsum, a high sulfate ion concentration might be advantageous. For control of calcium ion contamination, carbonate-bicarbonate combinations are indicated. An oxygen scavenging fluid may be prepared using a high sulfite ion concentration. The following illustrate combinations of salts for such purposes.

EXAMPLE 11

A mud is prepared containing 15 lbs./barrel of prehydrated Wyoming bentonite. To aliquot portions of this mud are added to the copolymer of Example 9(a) in amounts equivalent to 1 lb./barrel of mud and the following salts (dispersed in lbs./barrel of mud):

(a) 2 lbs. potassium chromate
   2 lbs. potassium bicarbonate
(b) 3 lbs. potassium sulfate
   ½ lb. potassium chromate
(c) 3 lbs. potassium chromate
   ½ lb. potassium chromate
   1 lb. potassium bicarbonate
(d) 2 lbs. sodium nitrate
   1 lb. sodium nitrite
   ½ lb. sodium chromate
   1 lb. sodium bicarbonate
(e) 3 lbs. sodium sulfite
   ½ lb. sodium chromate
   1 lb. sodium bicarbonate
(f) 2 lbs. potassium chloride
   2 lbs. potassium sulfate
   ½ lb. sodium chromate 50 g./350 cc. mud of clay (as in Example 2) are added and the degree of hydration, dispersion and condition noted after 24 hours. The results appear in the following table:

| Example 11: | Wt. increase of mud (lbs./ft.$^3$) |
|---|---|
| (a) | 0.7 |
| (b) | 1.0 |
| (c) | 0.5 |
| (d) | 1.1 |
| (e) | 1.1 |
| (f) | 1.0 |

In each instance the undispersed clay is in its original form and only slightly swollen.

As previously pointed out herein, various additives have been suggested and are used to control mud properties and in particular, viscosity and fluid loss. Many of these may be used in very small quantities but generally it is preferred to avoid their presence as they invariably lead to increased clay dispersion as illustrated in the following example.

EXAMPLE 12

In this example the dipsersion of a Northern California gas field clay (50 g. coarse clay to 350 cc. mud) is noted in various systems. With an inhibited type mud as in Example 3, there is complete dispersion after 1 hour (wt. increase 4.6 lbs./ft.$^3$) although the mud remains thin. With a conventional mud, the viscosity increases tremendously requiring constant and extreme dilutions with water. Mud weight increases slowly but eventually (24 hours) to the maximum (4.6–4.8 lbs./ft.$^3$). A conventional lime mud (lime causticized lignite tannin: pH=12.3) also gives slow clay dispersion but after 24 hours the mud weight increase is 2.8 lbs./ft.$^3$. The cohered inhibited muds of this invention (a) 3 lbs. sodium chromate—1 lb. of copolymer of Example 1–D (per barrel), and
(b) 3 lbs. potassium chromate—1 lb. copolymer of Example 1–D per barrel give weight increases of 1.3 and 1.1 lbs./ft.$^3$, respectively, and the muds remain very thin.

EXAMPLE 13

The procedure of Example 12 is again repeated using a commercial chrome lignosulfonate mud at 7 lbs./barrel (pH=8.0) vis-a-vis 5 muds of this invention and their action on clay samples obtained at about 4700 feet while drilling a well in Long Beach, Calif. The clay is crushed and screened to −10 +30 mesh and 50 g. sample in 350 cc. of mud is tested as above. In plain water the clay normally disintegrates rapidly. The results are tabulated below.

| | Mud wt. increase after 24 hours (lbs./ft.$^3$) |
|---|---|
| (1) Commercial mud | 3.9 |
| (2) 3 lbs./barrel potassium chromate; 1 lb./barrel copolymer of Example 1–D | 1.2 |
| (3) 3 lbs./barrel potassium sulfate; 1 lb./barrel copolymer of Example 1–D | 2.0 |
| (4) 3 lbs./barrel potassium chloride; 1 lb./barrel copolymer of Example 1–D | 1.7 |
| (5) 3 lbs./barrel sodium nitrate; 1 lb./barrel copolymer of Example 1–D | 1.2 |
| (6) 3 lbs./barrel sodium sulfite; 1 lb./barrel copolymer of Example 1–D | 1.5 |

As in previous examples the clay in Example 13–1 is reduced to sandy fines, while in Examples 13–2, –3, –4, –5 and –6, the clay is in its original firm, but slightly swollen and wet form.

The clay sample here tested contains considerable calcium clay and the tests herein confirm the efficacy of the present invention with such clays. The clay of this example is dense and brittle in comparison to Mojave clay. No doubt increased grinding by attrition accounts for the higher mud weight increases as compared with Mojave clay.

EXAMPLE 14

Example 13 is repeated using a clay core sample obtained from Louisiana at 8500 feet. The results are comparable to Example 13 insofar as cohered inhibiting action of the compositions of the present invention is concerned. The commercial inhibited mud acts similarly as in Example 13.

From FIGS. 1 and 2 of the accompanying drawing, it becomes clearly evident that the amount of the copolymer utilized in accordance with the present invention may be in a concentration of at least 0.35 pound per barrel (0.1%) of mud to yield the desired results. Below this concentration, the apparent viscosity, plastic viscosity, and yield value result in fluids which are unmanageable in the operating field. When the copolymer concentration is increased, these rheological properties decrease, giving muds having ideal fluid properties.

FIG. 1 represents a mud system containing no sodium chloride. FIG. 2 represents a mud system containing 3 pounds per barrel of sodium chloride. In both systems of FIGS. 1 and 2, low concentrations of the copolymer (about 0.1 pound per barrel) produce high viscosity mud systems. By the addition of more copolymer (from about 0.35 pound per barrel), very fluid and easily pumpable mud systems are obtained. The mud system characterized by FIG. 1 was obtained by adding to a base mud, free from sodium chloride but containing 15 pounds per barrel of Wyoming bentonite, increasing concentrations of the copolymer of methyl vinyl ether-maleic anhydride having a specific viscosity of 3.1 (1 percent by weight in methyl ethyl ketone at 25° C.). These muds were aged by rolling overnight at 150° F. After cooling to room temperature, the rheological properties were measured on a Fann viscometer (V.-G. meter). The fluid loss was measured by standard A.P.I. procedure.

The mud system characterized by FIG. 2 contained, in addition to the 15 pounds per barrel of Wyoming bentonite, 3 pounds of sodium chloride per barrel.

To determine the effect of copolymers of methyl vinyl ether-maleic anhydride (1:1 molar ratio) having varying specific viscosities on the cohered inhibition of a mud system, the following comparative experiments were performed:

EXAMPLE 15

A base mud was prepared containing 15 pounds per barrel of Wyoming bentonite. To 350 cc. of this base mud (1 laboratory barrel), was added in succession .7 gram of copolymer and 3 grams of sodium chloride. The mud was blended in a Waring Blendor for about 30 minutes. To the blended mud was then added 50 grams of screened (12–30 mesh) Mojave clay. The resulting mixture was rolled overnight in an oven at 150° F. After cooling to room temperature, the muds were poured through a 30-mesh screen to collect that portion of the clay which remained in a solid, cohered form and had not disintegrated. The reclaimed clay was then dried and weighed. The amount of clay remaining on the screen was then expressed as percent of the original 50 grams used in making up the initial mud.

The copolymer, which gives excellent cohered inhibition, is characterized by recoveries ranging from 80% to 100%. A copolymer which gives poor cohered inhibition is characterized by low percent recoveries.

Experiments were conducted in which copolymers of methyl vinyl ether-maleic anhydride (1:1 molar ratio) of varying specific viscosities were employed. The results obtained are shown in the following table:

TABLE

| Samples of copolymers of methyl vinyl ether-maleic anhydride (1:1 molar ratio) | Spec. visc. 1% by weight in methyl ethyl ketone at 25° C. | Spec. visc. 0.4% by weight in $H_2O$ [1] at 25° C. | Brookfield [2] viscosity centipoises 0.4% by weight in $H_2O$ [1] at 25° C. | Percent inhibition 20-mesh screen |
|---|---|---|---|---|
| Sample No. 1 | 0.084 | | | 11 |
| Sample No. 2 | 0.395 | 0.580 | 3.0 | 42 |
| Sample No. 3 | 1.420 | 3.112 | 6.0 | 78 |
| Sample No. 4 | 1.930 | 4.668 | 7.5 | 92 |
| Sample No. 5 | 3.738 | 6.962 | 10.5 | 93 |
| Sample No. 6 | 5.658 | 10.944 | 16.0 | 92 |

[1] The water contained 0.1 gram of (Cheelox) ethylene diamine tetraacetic acid, di-sodium salt, and 0.1 gram of thiourea per liter.
[2] No. 1 Spindle, 60 r.p.m., Brookfield, Model LVF Viscometer.

From the data presented in the foregoing table it is clear that copolymers of methyl vinyl ether-maleic anhydride (1:1 molar ratios) having specific viscosities below 1.3 (1 percent by weight in methyl ethyl ketone at 25° C.) give recoveries less than about 60 percent. When the same copolymer, but having a specific viscosity above 1.3, is employed, there is a surprising and unexpected increase in the percent recovery of cohered inhibited solids. What is more surprising, from the data presented in the table, is that when a copolymer of methyl vinyl ether-maleic anhydride in 1:1 molar ratio and having a specific viscosity of 1.93 or above is employed, recoveries of about 92 percent are obtained.

As the above examples indicate, many different combinations of copolymer and inorganic salts are contemplated within the present invention and while all perform in an outstanding and unexpected manner, some, of course, will be more indicated than others in certain specific applications, especially being dependent upon the nature of the substrate to be drilled. Of particular noteworthiness is the sulfite containing mud which is excellent in all systems and especially in the drilling of calcium shales. The sulfite muds also are excellent oxygen scavengers, which is added plus value. Upon oxidation, the sulfite will be converted to sulfate which, as exemplified, is an excellent anion, too. The use of carbonate and bicarbonate anions, especially with potassium cation, is also excellent for drilling through calcium shales or gypsum stringers since the calcium ion concentration can be controlled and maintained at a very low level.

Other variations in and modifications of the described processes which will be obvious to those skilled in the art can be made in this invention without departing from the scope or spirit thereof.

What is claimed is:

1. An earth bore drilling fluid providing cohered inhibition against hydratable clays comprising water, an inorganic solid suspending agent, from about 0.15% to about 1% by weight based on the weight of said drilling fluid of a copolymer obtained from the copolymerization of maleic anhydride with an alkyl vinyl ether in which the alkyl contains from 1 to 4 carbon atoms, said copolymer containing the comonomeric components in substantially equimolar amounts and having a specific viscosity of from 1.930 to 5.658 at 1% weight concentration in methyl ethyl ketone at 25° C., and from about 0.7% to about 1.2% by weight based on the weight of said drilling fluid of a water-soluble inorganic salt selected from the group consisting of sodium dichromate, sodium chromate, sodium molybdate, sodium nitrate, sodium nitrite, sodium sulfite, sodium chloride, sodium fluoride, sodium sulfamate, potassium sulfamate, potassium nitrate, potassium carbonate, potassium dichromate, potassium sulfite, cesium chloride, cesium fluoride, cesium nitrate, cesium sulfate, rubidium bromide, rubidium carbonate, rubidium chloride, rubidium dichromate, rubidium nitrate, rubidium sulfate, sodium bromide, potassium sulfate, potassium bicarbonate, sodium iodide, potassium chloride and potassium chromate.

2. A drilling fluid as defined in claim 1, wherein the alkyl vinyl ether is methyl vinyl ether.

3. A drilling fluid as defined in claim 1, wherein the inorganic salt is sodium chloride.

4. A drilling fluid as defined in claim 1, wherein the inorganic salt is potassium chloride.

5. A drilling fluid as defined in claim 1, wherein the clay is a montmorillonitic clay.

6. In a method for drilling a well with concurrent circulation in the well of an aqueous suspension of a finely divided solid inorganic material, the improvement yielding cohered inhibition against hydratable clays which comprises incorporating into said aqueous suspension from about 0.15% to about 1% by weight based on the weight of said aqueous suspension of a water soluble salt of a copolymer obtained from the copolymerization of maleic anhydride with an alkyl vinyl ether in which the alkyl contains from 1 to 4 carbon atoms, said copolymer containing the comonomeric components in substantially equimolar amounts, having a specific viscosity of from 1.930 to 5.658 at 1% weight concentration in methyl ethyl ketone at 25° C., and from about 0.7% to about 1.2% by weight based on the weight of said drilling fluid of a water-soluble inorganic salt selected from the group consisting of sodium dichromate, sodium chromate, sodium molybdate, sodium nitrate, sodium nitrite, sodium sulfite, sodium chloride, sodium fluoride, sodium sulfamate, potassium sulfamate, potassium nitrate, potassium carbonate, potassium dichromate, potassium sulfite, cesium chloride, cesium fluoride, cesium nitrate, cesium sulfate, rubidium bromide, rubidium carbonate, rubidium sulfate, sodium bromide, potassium sulfate, potassium bicarbonate, sodium iodide, potassium chloride and potassium chromate.

References Cited

UNITED STATES PATENTS

| 3,070,543 | 12/1962 | Scott. |
| 2,718,497 | 9/1955 | Oldham et al. |
| 2,476,474 | 7/1949 | Baer. |

FOREIGN PATENTS

| 535,786 | 1/1957 | Canada | 252—8.5 |
| 553,011 | 2/1958 | Canada | 252—8.5 |

HERBERT B. GUYNN, Primary Examiner

U.S. Cl. X.R.

252—8.5 B, 8.5 C